US012551990B2

(12) United States Patent
Ciciora et al.

(10) Patent No.: US 12,551,990 B2
(45) Date of Patent: Feb. 17, 2026

(54) INDIVIDUALIZED SOCKET HOLDERS

(71) Applicant: Truewerk, Inc., Denver, CO (US)

(72) Inventors: Brian Ciciora, Denver, CO (US); Michael Edwin Munter, Ashland, OR (US)

(73) Assignee: Truewerk, Inc., Denver, CO (US)

( * ) Notice: Subject to any disclaimer, the term of this patent is extended or adjusted under 35 U.S.C. 154(b) by 0 days.

(21) Appl. No.: 18/333,429

(22) Filed: Jun. 12, 2023

(65) Prior Publication Data

US 2024/0408725 A1 Dec. 12, 2024

(51) Int. Cl.

*B65D 85/28* (2006.01)
*B25B 13/06* (2006.01)
*B25H 3/04* (2006.01)

(52) U.S. Cl.

CPC .................................. *B25B 13/065* (2013.01)

(58) Field of Classification Search

CPC ....... B25B 13/06; B25B 13/065; B25B 13/56; B25H 3/003; B25H 3/04
USPC ......................... 206/372, 376, 378; 211/70.6
See application file for complete search history.

(56) References Cited

U.S. PATENT DOCUMENTS

| | | | | |
|---|---|---|---|---|
| 5,139,144 A * | 8/1992 | Robert, Jr. | B25H 3/003 | 206/378 |
| 6,095,329 A * | 8/2000 | Kao | B65D 85/20 | 206/378 |
| 8,307,980 B1 * | 11/2012 | Kao | B25H 3/04 | 206/378 |
| 8,381,905 B1 * | 2/2013 | Kao | B25H 3/003 | 206/378 |
| 8,387,791 B2 * | 3/2013 | Huang | B25H 3/022 | 206/378 |
| 8,573,413 B2 * | 11/2013 | Sh | B25H 3/04 | 211/70.6 |
| 9,138,890 B2 * | 9/2015 | Lee | B25H 3/003 | |
| 2003/0141211 A1 * | 7/2003 | Tsai | B25H 3/003 | 206/378 |
| 2007/0102381 A1 * | 5/2007 | Nguy | B25H 3/025 | 206/821 |
| 2009/0145865 A1 * | 6/2009 | Yu | B25H 3/003 | 700/95 |
| 2010/0012545 A1 * | 1/2010 | Bottoms | B65D 63/08 | 206/378 |

* cited by examiner

*Primary Examiner* — Luan K Bui
(74) *Attorney, Agent, or Firm* — Lynch LLP

(57) ABSTRACT

The inventive subject matter is directed to socket holders that feature through holes in their bases to facilitate stringing multiple socket holders together. Individual socket holders feature a base portion and a cylindrical portion extending therefrom. The base portion can include one or more concave surfaces that improve user grip, while also featuring a through hole that a flexible member such as a string made from any appropriate material can pass through. An entire set of sockets can be held together by coupling each socket to a socket holder and then stringing the socket holders all together using a flexible member. This reduces the amount of storage space required, makes it more difficult to lose a socket holder, improve portability by making it possible for a user to sling their socket set over a shoulder using the flexible member, and so on.

8 Claims, 4 Drawing Sheets

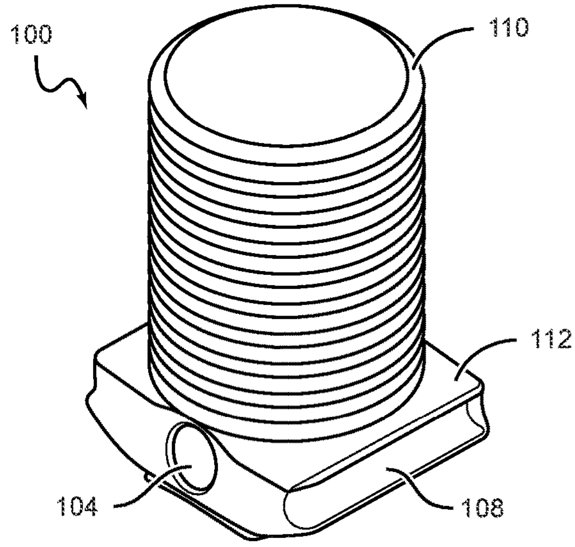
FIG. 1
FIG. 2
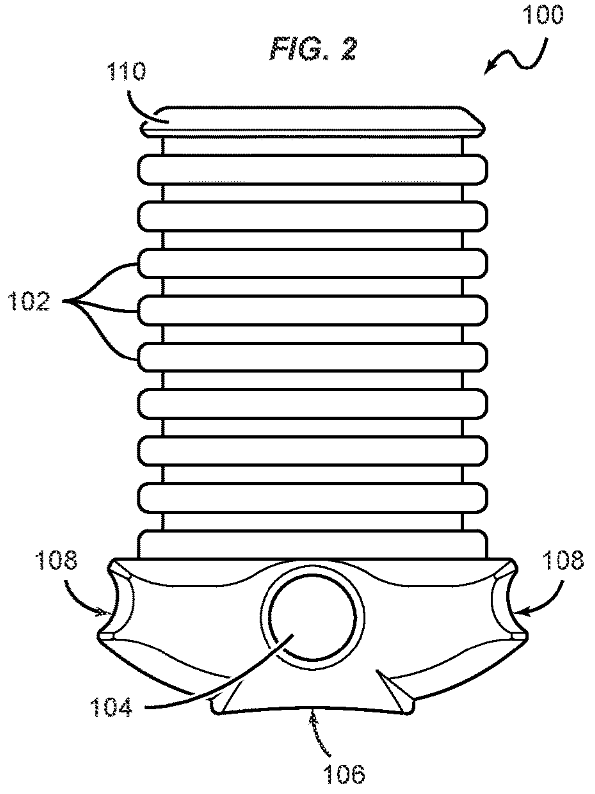
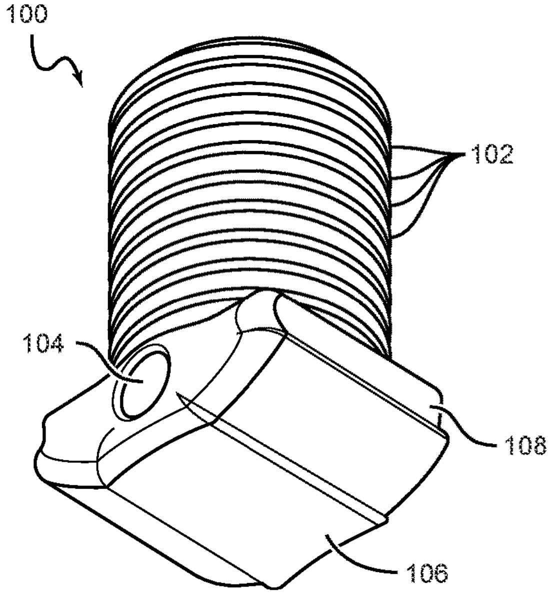
FIG. 3

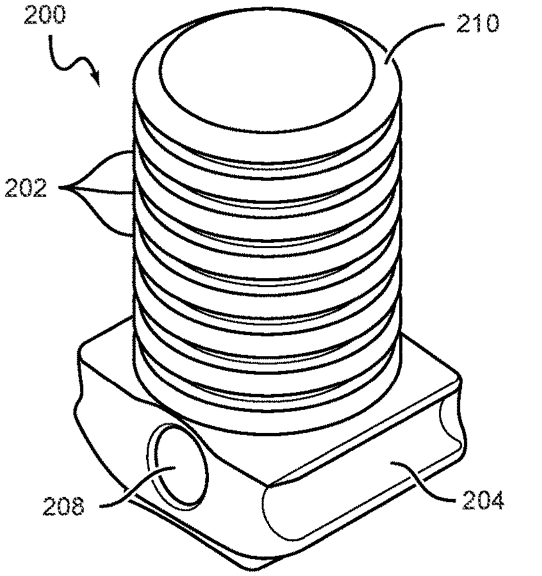
FIG. 4
FIG. 5
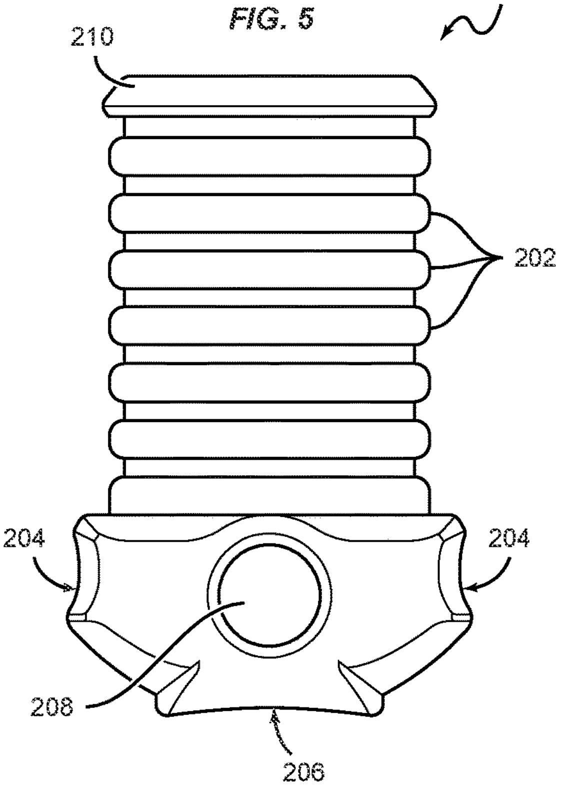
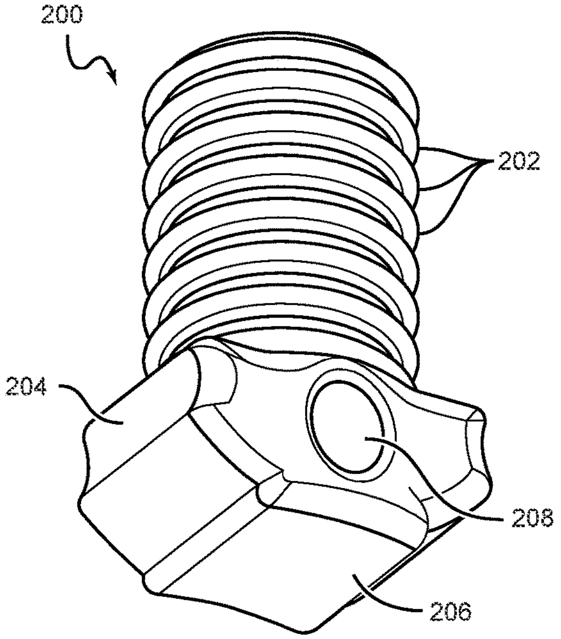
FIG. 6

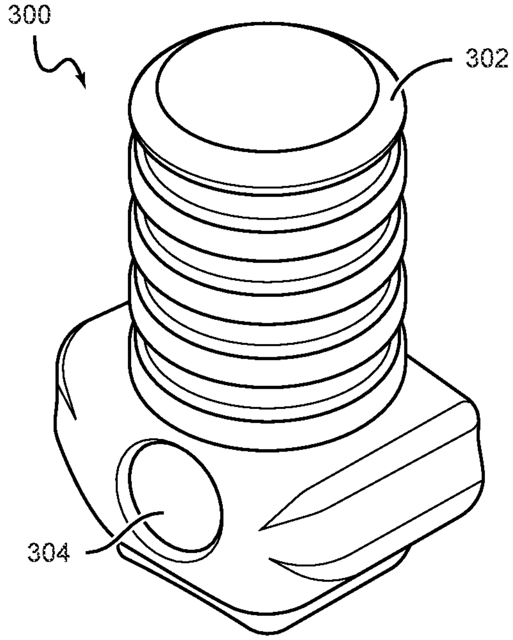
FIG. 7
FIG. 8
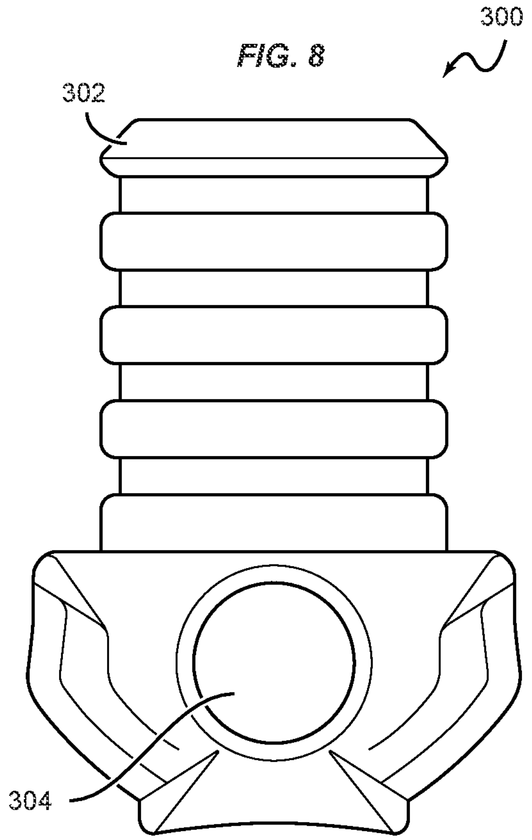
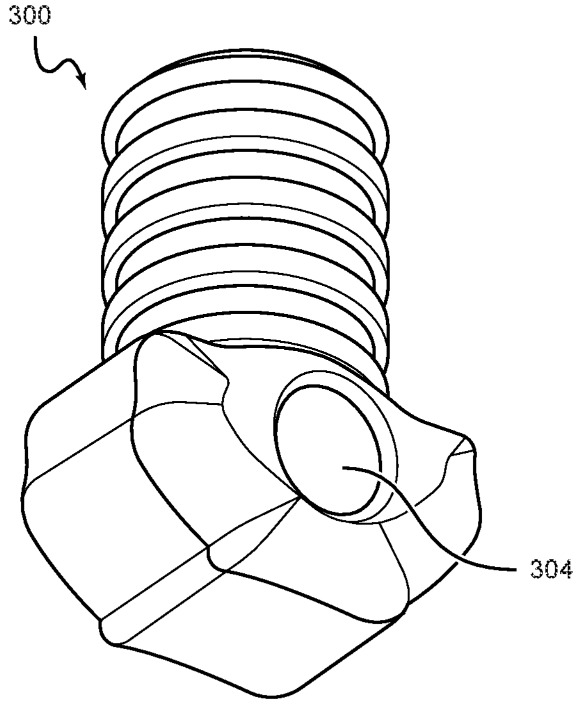
FIG. 9

INDIVIDUALIZED SOCKET HOLDERS

FIELD OF THE INVENTION

The field of the invention is socket holders for use with socket wrenches.

BACKGROUND

The background description includes information that may be useful in understanding the present invention. It is not an admission that any of the information provided in this application is prior art or relevant to the presently claimed invention, or that any publication specifically or implicitly referenced is prior art.

Socket holders have typically made either as a single piece of multiple pieces linked together by a rigid structural member. Existing socket holders can be cost effectiveness, easy to manufacture, and an able to keep all sockets together. But despite those benefits, socket holders that are designed with a rigid structural member fail to benefit from major advantages that can be conferred by the use of socket wrench holders that are designed to hold a single socket each.

When using a socket wrench, a person typically has to eyeball bolt head sizes and then test individual sockets until a fit is found. This requires a user to pull individual sockets off a holder one at a time, which can be difficult and frustrating. To keep sockets in place, socket holders make the process of removing a socket somewhat tedious and sometimes outright difficult. Thus, finding the right socket is made needlessly difficult. Moreover, ordinary socket holders cannot be slung over a shoulder, and finding a place to store a large, rigid member having many socket holders can be difficult.

If socket holders were individualized for each socket size, then each socket could be press against a bolt head to test for fit before even taking it off the holder. But individualized socket holders can result in lost sockets more easily than a large socket holder that holds all sockets together. Thus, there exists a need for individualized socket holders that are also connected to each other in some way to prevent loss.

SUMMARY OF THE INVENTION

The present invention provides apparatuses, systems, and methods directed to individualized socket holders that can be strung together by a flexible member. In one aspect of the inventive subject matter, a socket holder comprises: a base; a cylindrical portion disposed on a top surface of the base, where the base comprises a through hole and a bottom surface; and where the cylindrical portion has a set of radially disposed ridges.

In some embodiments, the set of radially disposed ridges are configured to mate with a socket by a pressure fit between the set of radially disposed ridges and an interior portion of the socket. The base can also have a first surface on a first side, a second surface on a second side, a third surface on a third side, and a fourth surface on a fourth side, where the through hole passes through the third surface and the fourth surface.

In some embodiments, the first surface, the second surface, and the bottom surface are all concave, and in some embodiments, a radially disposed ridge from the set is disposed at an end of the cylindrical portion. That radially disposed ridge can also include a tapered surface.

In another aspect of the inventive subject matter, a socket holder set includes: a first socket holder, a second socket holder, and a flexible member; the first socket holder has a first base and a first cylindrical portion disposed on the first base, where the first base has a first through hole; the second socket holder having a second base and a second cylindrical portion disposed on the second base, where the second base comprises a second through hole; and where the flexible member passes through the first through hole and the second through hole. In some embodiments, a first end of the flexible member couples with a second end of the flexible member.

In another aspect of the inventive subject matter, a socket holder comprises: a base; a cylindrical portion disposed on the base, where the cylindrical portion is sized and dimensioned to mate with a socket; and where the base comprises a through hole. In some embodiments, the cylindrical portion has a set of radially disposed ridges that are configured to mate with a socket by a pressure fit between the radially disposed ridges and an interior portion of the socket. The cylindrical portion can have a set of radially disposed ridges, and one of those ridges can be disposed at an end of the cylindrical portion. In some embodiments, that ridge at the end of the cylindrical portion has a tapered surface to improve mating with a socket.

In some embodiments, the base also has a first surface on a first side, a second surface on a second side, and a bottom surface. The first surface, the second surface, and the bottom surface can all be concave. The base can also have a third side and a fourth side that the through hole passes through.

One should appreciate that the disclosed subject matter provides many advantageous technical effects including improved storability, improved mobility, and improved usability while preserving function. Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a top, angled view of a first socket holder of the inventive subject matter.

FIG. 2 is a side view of the first socket holder.

FIG. 3 is a bottom, angled view of the first socket holder.

FIG. 4 is a top, angled view of a second socket holder of the inventive subject matter.

FIG. 5 is a side view of the second socket holder.

FIG. 6 is a bottom, angled view of the second socket holder.

FIG. 7 is a top, angled view of a third socket holder of the inventive subject matter.

FIG. 8 is a side view of the third socket holder.

FIG. 9 is a bottom, angled view of the third socket holder.

DETAILED DESCRIPTION

Figure 10:
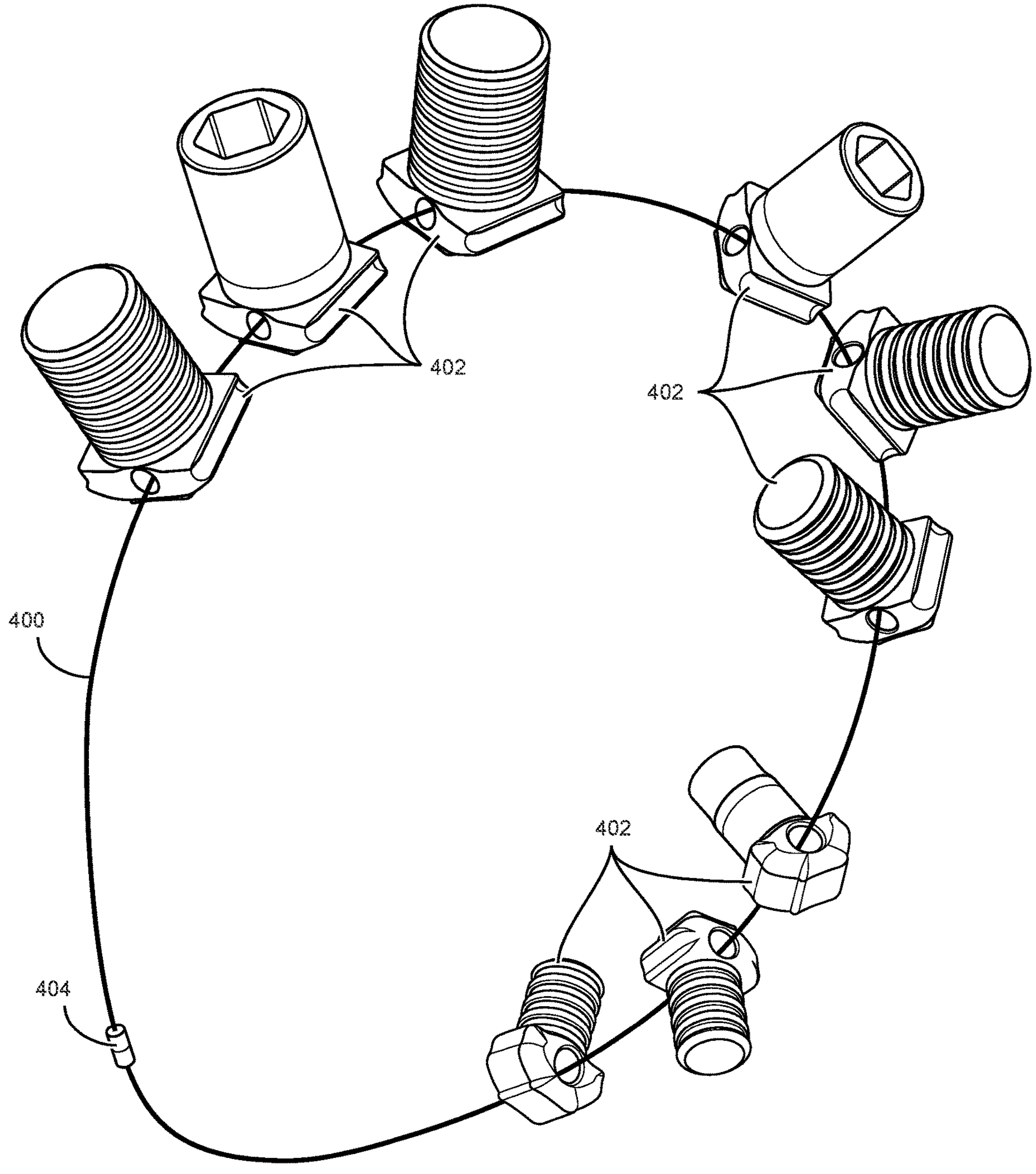
FIG. 10 shows how different embodiments of the socket holder can be coupled together.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of “a,” “an,” and “the” includes plural reference unless the context clearly dictates otherwise. Also, as used in the description in this application, the meaning of “in” includes “in” and “on” unless the context clearly dictates otherwise.

Also, as used in this application, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously.

In some embodiments, the numbers expressing quantities of ingredients, properties such as concentration, reaction conditions, and so forth, used to describe and claim certain embodiments of the invention are to be understood as being modified in some instances by the term “about.” Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

FIGS. 1-9 in this application are divided into three embodiments, which are all nearly identical to each other. Each embodiment described varies by size, though no claim is made to dimensions. FIGS. 1-3 are directed to a first sized socket holder (e.g., 0.5"), FIGS. 4-6 are directed to a second sized socket holder (e.g., 0.375"), and FIGS. 7-9 are directed to a third sized socket holder (e.g., 0.25"). Although the function of each embodiment is the same, the different embodiments vary slightly from each other.

FIGS. 1-3 are thus directed to a socket holder of the inventive subject matter that is configured to hold 0.5" sockets (i.e., sockets that can couple with a 0.5" socket holder), FIGS. 4-6 are directed to a socket holder of the inventive subject matter that is configured to hold 0.375" sockets (i.e., sockets that can couple with a 0.375" socket holder), and FIGS. 7-9 are directed to a socket holder of the inventive subject matter that is configured to hold 0.25" sockets (i.e., sockets that can couple with a 0.375" socket holder).

FIG. 1 shows socket holder 100 from a top, angled view. A top portion of the socket holder 100 is largely cylindrical with radially disposed ridges 102. The features described here regarding FIG. 1 also apply to the top portions of FIGS. 4 and 7. In embodiments where a socket holder is formed from a single material, the socket holder can be made from, e.g., a thermoplastic polyurethane (TPU), a thermoplastic elastomer (TPE), ethylene vinyl acetate (EVA), thermoplastic rubber (TPR), styrene block copolymers (SEBS), polymerized butadiene or any other material having similar material properties. In embodiments where a socket holder is made from multiple materials where, e.g., the socket holder is formed first as a metal part and then given a coating using a different material. For example, a socket holder can be made from aluminum, steel, titanium, or from one or more hard plastics such as nylon, acetal, acrylonitrile butadiene styrene (ABS), or the like, and it can then be given a coating or an overmold using a softer material (e.g., softer than the main body, or substrate, material). with an overmold of one of the soft materials discussed above.

In some embodiments, the ridges can be formed from the same material as the socket holder as described above. In some embodiments, the ridges can be formed from a different material, including any of the materials described above. For example, the socket holder body can be made from a first material (e.g., metal, plastic) while the ridges can be made from a second material (e.g., rubber, plastic). In some embodiments, the ridges can be created during an overmolding process such that an overmolded softer coating is what also creates the ridges on the cylindrical portion of a socket holder. By making the ridges out of a material such as a rubber or a plastic, a socket holder of the inventive subject matter can experience improved coupling with a socket.

Socket holder 100 is shown having ten total ridges 102. A socket holder of the inventive subject matter can have as few as two ridge (e.g., one at the top and one near the base). There is no maximum number of ridges, but there should be at least some amount of space between each ridge, as the purpose of the ridges is to create a pressure fit between socket holder 100 and a socket that is coupled thereto while still making it possible for a user to separate the socket without too much effort. The first ridge (i.e., the ridge closest to the tip of the cylindrical portion) features a tapered surface 110. Tapered surface 110 is intended to facilitate coupling socket holder 100 to a socket by making it easier to line up the cylindrical portion of the socket holder with the opening on the back side of a socket.

The bottom portion, or base, of socket holder 100 has several features, including a through hole 104, a bottom surface 106, and side curved surfaces 108. FIG. 2, which shows a side view of the socket holder shown in FIG. 1, shows ridges 102 as well as through hole 104. From this view, side curved surfaces 108 are shown to be slightly concave. Side curved surfaces 108 are designed with this slight concavity to improve grip. To remove a socket from a socket holder, a person must hold the socket holder and pull the socket off of the top portion. The side curved surfaces are thus designed to create a surface that is easier to grip while a user pulls a socket off of the socket holder.

Through hole 104 is included so that a lanyard, piece of webbing, or some other flexible member can pass therethrough. By allowing for a flexible member to pass through through hole 104, multiple socket holders of the inventive subject matter can be strung together. This creates a unique advantage over rigid socket holders: users can test whether a socket fits a bolt without removing it from the socket holder by just grabbing the socket holder and pressing the attached socket onto a bolt. Every other socket holder that is also connected by the flexible member can either be held aside or allowed to dangle. Additionally, by connecting socket holders together by a flexible member that, e.g., is tied off to form a loop, a single socket cannot be lost-instead, the only way to lose a socket is if the entire string of sockets is lost together. By having all the socket holders strung together, they are also much easier to spot if misplaced.

Including multiple socket holders on a single string can have other advantages, including improved storability and improved mobility. Many existing socket holders are either formed as a single piece or as individual pieces linked together by a solid structural member. This kind of configuration means that a set of socket holders often features a large rigid member that can be cumbersome for storage purposes. By stringing together socket holders along a flexible member, it is much easier to find enough storage space in a toolbox, a drawer, etc.

Another advantage of allowing socket holders of the inventive matter to be strung together along a flexible member is that socket holders can be converted into a wearable string, which frees up a user's hands. For example, if a person must ascend a ladder with their socket set, embodiments of the inventive subject matter make it possible to sling the flexible member over the user's shoulder such that the user can use both hands to climb the ladder while also bringing with them the entire socket set that is looped onto the flexible member. These advantages do not exist in any type of socket holder that features a rigid structural element holding multiple socket holders together.

As seen in FIG. 1, the bottom portion of socket holder 100 features a top surface 112. Top surface 112 is flared out wider than the diameter of the cylindrical portion so that a socket that is coupled with socket holder 100 can interact with the top surface 112 when it is attached to socket holder 100. In this way, top surface 112 can limit how far the socket can be pressed down on the socket holder in instances where the length of the cylinder portion of socket holder 100 is less than the interior portion of a socket that is configured to mate with socket holder 100 (and with a socket wrench or ratchet).

FIG. 3, which shows socket holder 100 from a bottom, angled view, shows a bottom surface 106 of socket holder 100. Bottom surface 106 is slightly concave. It is designed this way to give a surface that is easy to press against to attach a socket to socket holder 100. In a normal use case, a person would use their thumb to apply pressure to bottom surface 106 while holding onto a socket to couple socket holder 100 to that socket. Including slight concavity to bottom surface 106 makes it easier for a person to apply that pressure in a desired direction without losing grip or slipping.

FIGS. 4-6 show the same views as shown in FIGS. 1-3 of another socket holder 200. Socket holder 200 is largely the same as socket holder 100, with some minor differences. Socket holder 200 features fewer ridges 202. Because socket holder 200 is designed to accommodate smaller sockets than socket holder 100, and because ridges 202 are roughly the same size as ridges 102, there are fewer of them. The diameter of the cylindrical portion onto which ridges 202 are disposed would be smaller in this embodiment than in the previously described embodiment, though this embodiment nevertheless still includes side curved surfaces 204 and bottom surface 206. The length of the cylindrical portion of socket holder 200 can also be shorter than the length of the cylindrical portion of socket holder 100. Side curved surfaces 204 are slightly concave for the same reasons discussed above, and the same is true for bottom surface 206.

Like the embodiment above, socket holder 200 also includes through hole 208. Through hole 208 allows socket holder 200 to be coupled with other socket holders via flexible member, also as described above. This allows a user to create a string of socket holders that are all easily accessible. Socket holder 200 again features a tapered ridge 210 at the tip of the cylindrical portion, as seen best in FIG. 5. All other features described above regarding socket holder 100 are also true for socket holder 200.

Finally, FIGS. 7-9 show a third socket holder 300, which is smaller still than socket holder 200. The cylindrical portion of socket holder 300 has a smaller diameter and shorter length than the cylindrical portion of socket holder 200. Because of its shorter length and smaller diameter, it has fewer ridges, which are roughly the same across socket holder sizes. Socket holder 300 thus features five total ridges, with the ridge on the end (as with other embodiments) featuring a tapered surface 302, which, as discussed above, can make it easier to align a socket holder with a socket to couple the two together. Socket holder 300 includes all the same surfaces with the same general curvatures as other embodiments described in this application, and socket holder also includes through hole 304.

FIG. 10 shows how socket holders disclosed in this application can be linked together by a flexible member 400. Flexible member 400 can be any kind of string or chain that can be run through all the through holes of socket holders 402 of the inventive subject matter, as shown in the drawing. Flexible member 400 includes a coupling mechanism 404 that allows the flexible member to couple end to end to create a closed loop. By closing the loop, socket holders are held to the flexible member and cannot be removed without opening the loop of flexible member 400. This prevents loss. And because flexible member 400 can easily bend, a user can grab onto a single socket holder having a single socket disposed thereon and check to see whether that socket fits onto a bolt before even removing the socket from the socket holder. No rigid device holding multiple sockets is capable of doing the same thing for any number of socket holders. The number of socket holders that can be held by flexible member 400 is limited only by the length of flexible member 400.

Thus, specific systems and methods directed to socket holders have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A socket holding system comprising:

a socket holder comprising:

a base;

a cylindrical portion disposed on a top surface of the base;

wherein the base comprises a through hole and a bottom surface;

wherein the bottom surface is concave;

wherein the cylindrical portion comprises a set of radially disposed ridges;

wherein the through hole passes through the base to connect a first hole on a first side of the base with second hole on a second side of the base opposite the first side of the base;

a flexible member that passes through the through hole of the socket holder; and wherein the flexible member forms a loop.

2. The socket holding system of claim 1, wherein the set of radially disposed ridges are configured to mate with a socket by a pressure fit between the set of radially disposed ridges and an interior portion of the socket.

3. The socket holding system of claim 1, wherein the base further comprises a first surface on a first side, a second surface on a second side, a third surface on a third side, and a fourth surface on a fourth side, wherein the through hole passes through the third surface and the fourth surface.

4. The socket holding system of claim 3, wherein the first surface, the second surface, and the bottom surface are all concave.

5. The socket holding system of claim 1, wherein a radially disposed ridge from the set is disposed at an end of the cylindrical portion.

6. The socket holding system of claim 5, wherein the radially disposed ridge comprises a tapered surface.

7. A socket holder set comprising:

a first socket holder, a second socket holder, and a flexible member;

the first socket holder comprising a first base and a first cylindrical portion disposed on the first base, wherein the first base comprises a first through hole that passes through the base to connect a first hole on a first side of the first base with second hole on a second side of the first base opposite the first side of the first base;

the first base comprising a first concave bottom surface;

the second socket holder comprising a second base and a second cylindrical portion disposed on the second base, wherein the second base comprises a second through hole that passes through the base to connect a third hole on a first side of the second base with fourth hole on a second side of the second base opposite the first side of the second base;

the second base comprising a second concave bottom surface; and wherein the flexible member passes through the first through hole and the second through hole to form a loop.

8. The socket holder set of claim 7, wherein a first end of the flexible member couples with a second end of the flexible member.

* * * * *